United States Patent
Suzuki

(10) Patent No.: US 10,227,254 B2
(45) Date of Patent: *Mar. 12, 2019

(54) GLASS MATERIAL AND METHOD FOR MANUFACTURING SAME

(71) Applicant: NIPPON ELECTRIC GLASS CO., LTD., Otsu-shi, Shiga (JP)

(72) Inventor: Futoshi Suzuki, Otsu (JP)

(73) Assignee: NIPPON ELECTRIC GLASS CO., LTD., Shiga (JP)

(*) Notice: Subject to any disclaimer, the term of this patent is extended or adjusted under 35 U.S.C. 154(b) by 0 days.

This patent is subject to a terminal disclaimer.

(21) Appl. No.: 15/503,012

(22) PCT Filed: Jan. 22, 2016

(86) PCT No.: PCT/JP2016/051902
§ 371 (c)(1),
(2) Date: Feb. 10, 2017

(87) PCT Pub. No.: WO2016/121655
PCT Pub. Date: Aug. 4, 2016

(65) Prior Publication Data
US 2017/0226002 A1    Aug. 10, 2017

(30) Foreign Application Priority Data

Jan. 28, 2015 (JP) ................................. 2015-013950
Nov. 17, 2015 (JP) ................................. 2015-224404

(51) Int. Cl.
*C03C 3/12* (2006.01)
*G02F 1/00* (2006.01)
(Continued)

(52) U.S. Cl.
CPC ................ *C03C 3/15* (2013.01); *C03B 19/06* (2013.01); *C03B 19/1005* (2013.01);
(Continued)

(58) Field of Classification Search
CPC .. C03C 3/19; C03C 3/068; C03C 3/15; C03C 3/095; C03C 3/125; C03C 4/00;
(Continued)

(56) References Cited

U.S. PATENT DOCUMENTS 3,971,723 A    7/1976   Tajima et al.
6,482,758 B1 * 11/2002  Weber ..................... C03C 3/062
                                                          501/41
(Continued)

FOREIGN PATENT DOCUMENTS

JP       43-000235 B1    1/1968
JP       51-46524 B2    12/1976
(Continued)

OTHER PUBLICATIONS

Official Communication issued in International Patent Application No. PCT/JP2016/051902, dated Apr. 5, 2016.
(Continued)

*Primary Examiner* — Bijan Ahvazi
(74) *Attorney, Agent, or Firm* — Keating and Bennett, LLP

(57) ABSTRACT

Provided is a glass composition that exhibits greater Faraday effect than ever before. A glass composition contains 48% or more of $Tb_2O_3$ (exclusive of 48%) in % by mole.

3 Claims, 1 Drawing Sheet

(51) Int. Cl.
*C03C 3/15* (2006.01)
*C03C 3/095* (2006.01)
*C03B 19/06* (2006.01)
*C03C 3/068* (2006.01)
*C03C 3/19* (2006.01)
*C03C 4/00* (2006.01)
*C03B 40/04* (2006.01)
*C03B 19/10* (2006.01)

(52) U.S. Cl.
CPC ............... *C03B 40/04* (2013.01); *C03C 3/068* (2013.01); *C03C 3/095* (2013.01); *C03C 3/125* (2013.01); *C03C 3/19* (2013.01); *C03C 4/00* (2013.01); *G02F 1/0036* (2013.01); *C03B 19/063* (2013.01)

(58) Field of Classification Search
CPC ... C03B 19/06; C03B 19/063; C03B 19/1005; C03B 40/04; G02F 1/0036
USPC ...... 65/84; 252/62.51 R; 501/41, 50, 52, 73, 501/78
See application file for complete search history.

(56) References Cited

U.S. PATENT DOCUMENTS

2013/0222909 A1* 8/2013 Makikawa ............ C30B 13/24
359/484.03
2015/0344349 A1 12/2015 Sato et al.

FOREIGN PATENT DOCUMENTS

| JP | 52-32881 B2 | 8/1977 | |
| JP | 55-42942 B2 | 11/1980 | |
| JP | 04-170338 A | 6/1992 | |
| JP | 08-259242 A | 10/1996 | |
| JP | 10-297933 | * 11/1998 | ............ C03C 3/064 |
| JP | 10-297933 A | 11/1998 | |
| WO | 2009/004710 A1 | 1/2009 | |
| WO | 2014/103662 A1 | 7/2014 | |

OTHER PUBLICATIONS

Smith, "Some light on glass", Glass Technology, vol. 20, No. 4, Aug. 1979, pp. 149-157.
Suzuki, "Glass Material and Method for Manufacturing Same", U.S. Appl. No. 15/704,126, filed Sep. 14, 2017.

* cited by examiner

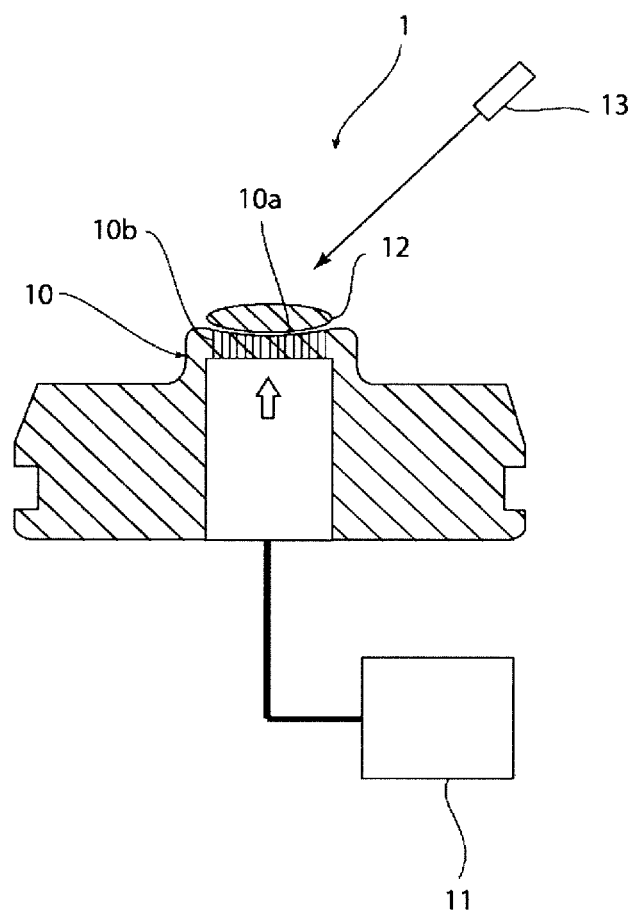

GLASS MATERIAL AND METHOD FOR MANUFACTURING SAME

TECHNICAL FIELD

The present invention relates to a glass material suitable for a magneto-optical element making up part of a magnetic device, such as an optical isolator, an optical circulator or a magnetic sensor, and a method for manufacturing the same.

BACKGROUND ART

A glass material containing terbium oxide which is a paramagnetic compound is known to exhibit the Faraday effect which is one of magneto-optical effects. The Faraday effect is an effect of rotating the polarization plane of linearly polarized light passing through a material placed in a magnetic field. This effect is utilized in optical isolators, magnetic field sensors, and so on.

The optical rotation θ (angle of rotation of the polarization plane) due to the Faraday effect is expressed by the following formula where the intensity of a magnetic field is represented by H and the length of a substance through which polarized light passes is represented by L. In the formula, V represents a constant dependent on the type of the substance and is referred to as a Verdet constant. The Verdet constant takes positive values for diamagnetic substances and negative values for paramagnetic substances. The larger the absolute value of the Verdet constant, the larger the absolute value of the optical rotation, resulting in exhibition of greater Faraday effect.

θ=VHL

Conventionally known glass materials exhibiting the Faraday effect include $SiO_2$—$B_2O_3$—$Al_2O_3$—$Tb_2O_3$-based glass materials (see Patent Literature 1), $P_2O_5$—$B_2O_3$—$Tb_2O_3$-based glass materials (see Patent Literature 2), and $P_2O_5$—$TbF_3$—$RF_2$— (where R represents an alkaline earth metal) based glass materials (see Patent Literature 3).

CITATION LIST

Patent Literature

[PTL 1]
Examined Japanese Patent Application Publication No. S51-46524
[PTL 2]
Examined Japanese Patent Application Publication No. S52-32881
[PTL 3]
Examined Japanese Patent Application Publication No. S55-42942

SUMMARY OF INVENTION

Technical Problem

Although the above glass materials exhibit some degree of Faraday effect, recent increasing size reduction of magnetic devices requires further improvement of the Faraday effect so that even a small member can exhibit a sufficient optical rotation.

In view of the foregoing, an object of the present invention is to provide a glass material exhibiting greater Faraday effect than ever before.

Solution to Problem

A glass material of the present invention contains 48% or more of $Tb_2O_3$ (exclusive of 48%) in % by mole. Since the glass material of the present invention contains a large amount of $Tb_2O_3$ as described above, the absolute value of the Verdet constant becomes large. As a result, the glass material exhibits greater Faraday effect than ever before. A glass material containing a large amount of $Tb_2O_3$ as described above is generally difficult to vitrify. However, a containerless levitation technique as will be described later enables even such a composition difficult to vitrify to be easily vitrified.

The glass material of the present invention preferably has a $Tb_2O_3$ content of not more than 80% by mole. When the $Tb_2O_3$ content is in this range, the glass material can be relatively easily vitrified.

The glass material of the present invention preferably further contains, in % by mole, 0 to 50% $SiO_2$, 0 to 50% $B_2O_3$, 0 to 50% $Al_2O_3$, and 0 to 50% $P_2O_5$. Because $SiO_2$, $B_2O_3$, $Al_2O_3$, and $P_2O_5$ are components for forming a glass network, incorporation of these components into the glass material enables the glass material to be relatively easily vitrified.

The glass material of the present invention can be used as a magneto-optical element. For example, the glass material of the present invention can be used as a Faraday rotator which is a type of magneto-optical element. The use of the glass material for the above application enables the glass material to be given the effect of the present invention.

A method for manufacturing a glass material of the present invention is a method for manufacturing the glass material described above and includes the step of heating a block of glass raw material to melting while holding the block of glass raw material levitated, thus obtaining a molten glass, and then cooling the molten glass.

Generally, a glass material is produced by melting a row material in a melting container, such as a crucible, and then cooling it (melting method). However, the glass material of the present invention has, as described above, a composition containing a large amount of $Tb_2O_3$ fundamentally not forming a glass network and is therefore a less vitrifiable material, which may present a problem that the use of the melting method would result in progression of crystallization originating on the contact interface with the melting container.

Even if the glass material has a less vitrifiable composition, vitrification thereof can be achieved by eliminating contact at the interface with the melting container. As such a technique, a containerless levitation technique is known in which a raw material is melted and cooled while held levitated. With the use of this technique, the molten glass is substantially kept out of contact with the melting container, so that crystallization originating on the interface with the melting container can be prevented and the glass material can be thus vitrified.

Advantageous Effects of Invention

According to the present invention, it is possible to provide a glass material exhibiting greater Faraday effect than ever before.

BRIEF DESCRIPTION OF DRAWINGS

FIG. 1 is a schematic cross-sectional view showing one embodiment of an apparatus for producing a glass material of the present invention.

DESCRIPTION OF EMBODIMENTS

The glass material of the present invention contains, in % by mole, 48% or more of $Tb_2O_3$ (exclusive of 48%), preferably 49% or more of $Tb_2O_3$, and particularly preferably 50% or more of $Tb_2O_3$. If the $Tb_2O_3$ content is too small, the absolute value of the Verdet constant becomes small, so that sufficient Faraday effect is less likely to be achieved. On the other hand, if the $Tb_2O_3$ content is too large, the glass material tends to be difficult to vitrify. Therefore, the $Tb_2O_3$ content is preferably not more than 80%, more preferably not more than 75%, and particularly preferably not more than 70%.

In relation to Tb, the content of its trivalent oxide has been defined above, but, as for its oxides other than the trivalent oxide, their content when converted to the trivalent oxide is preferably in the above range.

The magnetic moment from which the Verdet constant of Tb is derived is greater in $Tb^{3+}$ than in $Tb^{4+}$. A larger percentage of $Tb^{3+}$ in the glass material is more preferable because the Faraday effect becomes greater. Specifically, the percentage of $Tb^{3+}$ in the total content of Tb is, in % by mole, preferably 50% or more, more preferably 60% or more, still more preferably 70% or more, yet more preferably 80% or more, and particularly preferably 90% or more.

The glass material of the present invention may contain, in addition to $Tb_2O_3$, the following various types of components. In the following description of the contents of components, "%" refers to "% by mole" unless otherwise specified.

$SiO_2$, $B_2O_3$, and $P_2O_5$ are components for forming a glass network and widening the vitrification range. However, these components do not contribute to increase in the Verdet constant. Therefore, if the content of these components is too large, sufficient Faraday effect is less likely to be achieved. Hence, the content of each of $SiO_2$, $B_2O_3$, and $P_2O_5$ is preferably 0 to 50%, more preferably 1 to 45%, and particularly preferably 2 to 40%. Furthermore, the total amount of $SiO_2$ and $B_2O_3$ is preferably 0 to 52%, more preferably 15 to 51%, and particularly preferably 20 to 50%. The total amount of $B_2O_3$ and $P_2O_5$ is preferably 0 to 52%, more preferably 15 to 51%, and particularly preferably 20 to 50%. The total amount of $SiO_2$, $B_2O_3$, and $P_2O_5$ is preferably 0 to 52%, more preferably 15 to 51%, and particularly preferably 20 to 50%.

$Al_2O_3$ is a component for forming a glass network as an intermediate oxide and widening the vitrification range. However, $Al_2O_3$ does not contribute to increase in the Verdet constant. Therefore, if its content is too large, sufficient Faraday effect is less likely to be achieved. Hence, the $Al_2O_3$ content is preferably 0 to 50%, more preferably 0.1 to 40%, still more preferably 1 to 30%, yet more preferably 1 to 20%, and particularly preferably 1 to 10%.

$La_2O_3$, $Gd_2O_3$, $Yb_2O_3$, and $Y_2O_3$ have the effect of stabilizing glass, but an excessive large content thereof contrariwise makes the glass material less likely to be vitrified. Therefore, the content of each of $La_2O_3$, $Gd_2O_3$, $Yb_2O_3$, and $Y_2O_3$ is preferably 10% or less and particularly preferably 5% or less.

$Dy_2O_3$, $Eu_2O_3$, and $Ce_2O_3$ stabilize glass and contributes to increase in the Verdet constant. However, an excessive large content thereof contrariwise makes the glass material less likely to be vitrified. Therefore, the content of each of $Dy_2O_3$, $Eu_2O_3$, and $Ce_2O_3$ is preferably 15% or less and particularly preferably 10% or less. In relation to Dy, Eu, and Ce, the contents of their trivalent oxides have been defined above, but, as for their oxides (for example, $CeO_2$) other than trivalent oxides, their contents when converted to the trivalent oxides are preferably in the above range.

MgO, CaO, SrO, and BaO have the effect of increasing the stability and chemical durability of glass. However, these components do not contribute to increase in the Verdet constant. Therefore, if the content of them is too large, sufficient Faraday effect is less likely to be achieved. Hence, the content of each of these component is preferably 0 to 10% and particularly preferably 0 to 5%.

$Ga_2O_3$ has the effect of increasing the glass formation ability and widening the vitrification range. However, an excessive large content thereof makes the resultant glass likely to be devitrified. Furthermore, $Ga_2O_3$ does not contribute to increase in the Verdet constant. Therefore, if its content is too large, sufficient Faraday effect is less likely to be achieved. Hence, the $Ga_2O_3$ content is preferably 0 to 6% and particularly preferably 0 to 5%.

Fluorine has the effect of increasing the glass formation ability and widening the vitrification range. However, if its content is too large, fluorine volatilizes during melting, which may vary the glass composition or may have an influence on the stability of glass. Therefore, the fluorine content (in terms of $F_2$) is preferably 0 to 10%, more preferably 0 to 7%, and still more preferably 0 to 5%.

$Sb_2O_3$ may be added as a reductant. However, in order to avoid coloration or in consideration of environmental burden, the $Sb_2O_3$ content is preferably 0.1% or less.

The glass material of the present invention preferably has a light transmission loss as small as possible, particularly when used as a magneto-optical element, such as an isolator. Therefore, the glass material of the present invention has a light transmittance of preferably 50% or more, more preferably 60% or more, and particularly preferably 70% or more at a wavelength of 633 nm.

The glass material of the present invention can be produced, for example, by a containerless levitation technique. FIG. 1 is a schematic cross-sectional view showing an example of an apparatus for manufacturing a glass material by a containerless levitation technique. Hereinafter, a description will be given of a method for manufacturing a glass material of the present invention with reference to FIG. 1.

The apparatus 1 for manufacturing a glass material includes a forming die 10. The forming die 10 also serves as a melting container. The forming die 10 includes a forming surface 10a and a plurality of gas jet holes 10b opening on the forming surface 10a. The gas jet holes 10b are connected to a gas supply mechanism 11, such as a compressed gas cylinder. Gas is supplied from this gas supply mechanism 11 via the gas jet holes 10b to the forming surface 10a. No particular limitation is placed on the type of the gas and the gas may be, for example, air or oxygen or may be nitrogen gas, argon gas, helium gas, carbon monoxide gas, carbon dioxide gas or hydrogen-containing reducing gas.

In manufacturing a glass material using the manufacturing apparatus 1, first, a block 12 of glass raw material is placed on the forming surface 10a. Examples of the block 12 of glass raw material include a body obtained by forming raw material powders into a single piece by press forming or other processes, a sintered body obtained by forming raw material powders into a single piece by press forming or other processes and then sintering the single piece, and an aggregate of crystals having the same composition as a desired glass composition.

Next, gas is jetted out through the gas jet holes 10b, thus levitating the block 12 of glass raw material above the forming surface 10a. In other words, the block 12 of glass raw material is held out of contact with the forming surface 10a. In this state, the block 12 of glass raw material is irradiated with laser light from a laser light applicator 13.

Thus, the block 12 of glass raw material is heated to melting to make it vitrifiable, thereby obtaining a molten glass. Thereafter, the molten glass is cooled, so that a glass material can be obtained. During the step of heating the block 12 of glass raw material to melting and the step of cooling the molten glass and in turn the glass material at least to below the softening point, at least the jetting of gas is preferably continued to restrain the contact of the block 12 of glass raw material, the molten glass, and finally the glass material with the forming surface 10*a*. The block 12 of glass raw material may be levitated above the forming surface 10*a* using a magnetic force generated by applying a magnetic field. Furthermore, the method for heating the block of glass raw material to melting may be radiation heating besides the method of irradiating it with laser light.

EXAMPLES

The present invention will be described below with reference to examples but the present invention is not at all limited by the following examples.

Table 1 shows examples of the present invention and comparative examples.

TABLE 1

|  |  | Ex. | | | | | | | Comp. Ex. |
| --- | --- | --- | --- | --- | --- | --- | --- | --- | --- |
|  |  | 1 | 2 | 3 | 4 | 5 | 6 | 7 | 1 |
| Glass Composition | $Tb_2O_3$ | 50 | 60 | 60 | 50 | 50 | 60 | 80 | 30 |
| (% by mole) | $Al_2O_3$ | 20 |  | 5 | 10 | 20 | 5 |  | 20 |
|  | $B_2O_3$ | 30 | 35 | 25 | 20 | 20 | 35 | 17.5 |  |
|  | $P_2O_5$ |  |  |  | 5 | 20 |  |  |  |
|  | $SiO_2$ |  | 5 | 5 |  | 10 |  | 2.5 | 50 |
| Verdet Constant | 633 nm | −0.69 | −0.80 | −0.79 | −0.69 | −0.70 | −0.79 | −1.04 | −0.37 |
| (min/Oe · cm) | 850 nm | −0.34 | −0.40 | −0.39 | −0.34 | −0.35 | −0.39 | −0.52 | −0.18 |

Each sample was prepared in the following manner. First, raw materials formulated to have a glass composition indicated in the table were press-formed and sintered at 1100 to 1400° C. for 12 hours, thus producing a block of glass raw material.

Next, the block of glass raw material was coarsely ground into 0.05 to 0.5 g small pieces. Using the obtained small piece of the block of glass raw material, a glass material (with a diameter of approximately 1 to 8 mm) was produced by a containerless levitation technique using an apparatus conforming to FIG. 1. A 100 W $CO_2$ laser oscillator was used as a heat source. Furthermore, nitrogen gas was used as a gas for levitating the block of raw material and supplied at a flow rate of 1 to 30 L/min.

The obtained glass material was measured in terms of the Verdet constant using a Kerr effect measuring system (manufactured by JASCO Corporation, Model K-250). Specifically, the obtained glass material was polished to have a thickness of about 1 mm and measured in terms of angle of Faraday rotation at a wavelength of 400 to 850 nm in a magnetic field of 15 kOe and the Verdet constants thereof at wavelengths of 633 nm and 850 nm were calculated. The wavelength sweep speed was 6 nm/min. The results are shown in Table 1.

As is obvious from Table 1, the glass materials of Examples 1 to 7 exhibited Verdet constants of −0.69 to −1.04 at a wavelength of 633 nm and Verdet constants of −0.34 to −0.52 at a wavelength of 850 nm. On the other hand, the Verdet constants of the glass material of Comparative Example 1 were −0.37 at a wavelength of 633 nm and −0.18 at a wavelength of 850 nm, the absolute values of which were small.

INDUSTRIAL APPLICABILITY

The glass material of the present invention is suitable as a magneto-optical element making up part of a magnetic device, such as an optical isolator, an optical circulator or a magnetic sensor.

REFERENCE SIGNS LIST

1: apparatus for manufacturing a glass material
10: forming die
10*a*: forming surface
10*b*: gas jet hole
11: gas supply mechanism
12: block of glass raw material
13: laser light applicator

The invention claimed is:

1. A method for manufacturing a glass material containing more than 48% of $Tb_2O_3$, 0 to 40% $Al_2O_3$, less than 5% $Ga_2O_3$, and 2 to 50% $B_2O_3$ in % by mole of a total glass composition and being used as a Faraday rotator, the method comprising the step of heating a block of glass raw material to melting while holding the block of glass raw material levitated, thus obtaining a molten glass, and then cooling the molten glass.

2. The method for manufacturing the glass material according to claim 1, wherein the glass material contains not more than 80% by mole of $Tb_2O_3$.

3. The method for manufacturing the glass material according to claim 1, wherein the glass material contains, in % by mole, 50 to 80% $Tb_2O_3$, 0 to 50% $SiO_2$, 0 to 40% $Al_2O_3$, less than 5% $Ga_2O_3$, 2 to 50% $B_2O_3$, and 0 to 50% $P_2O_5$.

* * * * *